US009485383B2

United States Patent
Nozato et al.

(10) Patent No.: US 9,485,383 B2
(45) Date of Patent: Nov. 1, 2016

(54) IMAGE BASED CORRECTION OF DISTORTION FROM A SCANNER

(71) Applicants: CANON KABUSHIKI KAISHA, Tokyo (JP); University of Rochester, Rochester, NY (US)

(72) Inventors: Koji Nozato, Rochester, NY (US); Qiang Yang, Rochester, NY (US)

(73) Assignees: Canon Kabushiki Kaisha, Tokyo (JP); UNIVERSITY OF ROCHESTER, Rochester, NY (US)

( * ) Notice: Subject to any disclaimer, the term of this patent is extended or adjusted under 35 U.S.C. 154(b) by 250 days.

(21) Appl. No.: 14/096,902

(22) Filed: Dec. 4, 2013

(65) Prior Publication Data

US 2015/0156365 A1 Jun. 4, 2015

(51) Int. Cl.
   *H04N 1/047* (2006.01)
   *H04N 1/04* (2006.01)

(52) U.S. Cl.
   CPC ............... *H04N 1/047* (2013.01); *H04N 1/04* (2013.01); *H04N 2201/04789* (2013.01)

(58) Field of Classification Search
   None
   See application file for complete search history.

(56) References Cited

U.S. PATENT DOCUMENTS

| 4,213,678 | A | * | 7/1980 | Pomerantzeff | A61B 3/1025 |
| | | | | | 351/206 |
| 4,378,562 | A | * | 3/1983 | Oosaka | G01D 15/14 |
| | | | | | 346/107.4 |
| 4,591,236 | A | * | 5/1986 | Broockman | G06K 7/10663 |
| | | | | | 235/457 |
| 4,886,351 | A | * | 12/1989 | Sabban | A61F 9/008 |
| | | | | | 351/205 |
| 5,155,343 | A | * | 10/1992 | Chandler | G06K 7/10871 |
| | | | | | 235/454 |
| 5,296,703 | A | | 3/1994 | Tsien | |
| 6,341,865 | B1 | * | 1/2002 | Muehlhoff | A61B 3/1225 |
| | | | | | 351/221 |
| 6,345,116 | B1 | * | 2/2002 | Kojima | H04N 1/3876 |
| | | | | | 358/518 |
| 6,650,441 | B1 | * | 11/2003 | Horigome | H04N 1/053 |
| | | | | | 358/472 |

(Continued)

FOREIGN PATENT DOCUMENTS

| JP | H11-225965 A | 8/1999 |
| JP | 2009-145826 A | 7/2009 |
| JP | 2013-180163 A | 9/2013 |
| JP | 2014-68703 A | 4/2014 |
| WO | 2012/020811 A1 | 2/2012 |

OTHER PUBLICATIONS

Adeel Ahmad, Steven G. Adie, Eric J. Chaney, Utkarsh Sharma, Stephen A. Boppart, Cross-Correlation-Based Image Acquisition Technique for Manually-Scanned Optical Coherence Tomography, Optics Express, May 11, 2009, 17(10):8125-8136, The Optical Society of America, Washington DC, 2009.

Daniel X. Hammer, R. Daniel Ferguson, Chad E. Bigelow, Nicusor V. Iftimia, Teoman E. Ustun, Stephen A. Burns, Adaptive Optics Scanning Laser Ophthalmoscope for Stabilized Retinal Imaging, NIH-PA Author Manuscript, Optics Express, Apr. 17, 2006, 14(8):3354-3367, The Optical Society of America, Washington DC, 2006.

David G. Tweed, Resonant Scanner Linearization Techniques, Optical Engineering, 1985, 24(6):1018-1022, SPIE, Bellingham, WA, 1985.

*Primary Examiner* — Vu Le
*Assistant Examiner* — Alexander J Lesnick
(74) *Attorney, Agent, or Firm* — Canon U.S.A., Inc. I.P. Division

(57) ABSTRACT

System, method, and non-transitory computer readable medium encoded with instructions for imaging an object. Dividing raw data into forward scan data and backward scan data. Reversing the order of the backward scan data to produce inverted backward scan data. Determining an offset value that is associated with a maximum value of a first function based on the forward scan data and the inverted backward scan data. The forward scan data is shifted by the offset value relative to the inverted backward scan data. Producing a first image of the object that comprises the forward scan data interlaced with the inverted backward scan data. The forward scan data is shifted by the offset value relative to the inverted backward scan data.

18 Claims, 9 Drawing Sheets

(56) References Cited

U.S. PATENT DOCUMENTS

| | | |
|---|---|---|
| 2002/0024006 A1 | 2/2002 | Engelhardt |
| 2009/0008539 A1 | 1/2009 | Steinert |
| 2009/0278918 A1* | 11/2009 | Marcus .............. G02B 27/2228 348/54 |
| 2010/0060967 A1* | 3/2010 | Park ..................... G02B 26/105 359/223.1 |
| 2010/0321752 A1 | 12/2010 | Steinert et al. |
| 2012/0257166 A1* | 10/2012 | Francis .............. G02B 21/0028 351/208 |
| 2013/0175433 A1 | 7/2013 | Kishimoto |

* cited by examiner

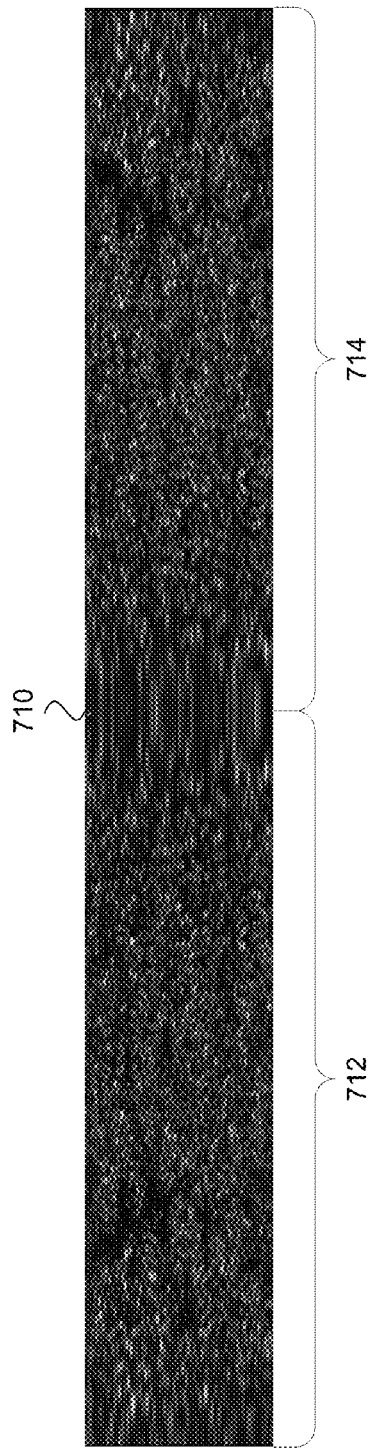
FIG. 7A
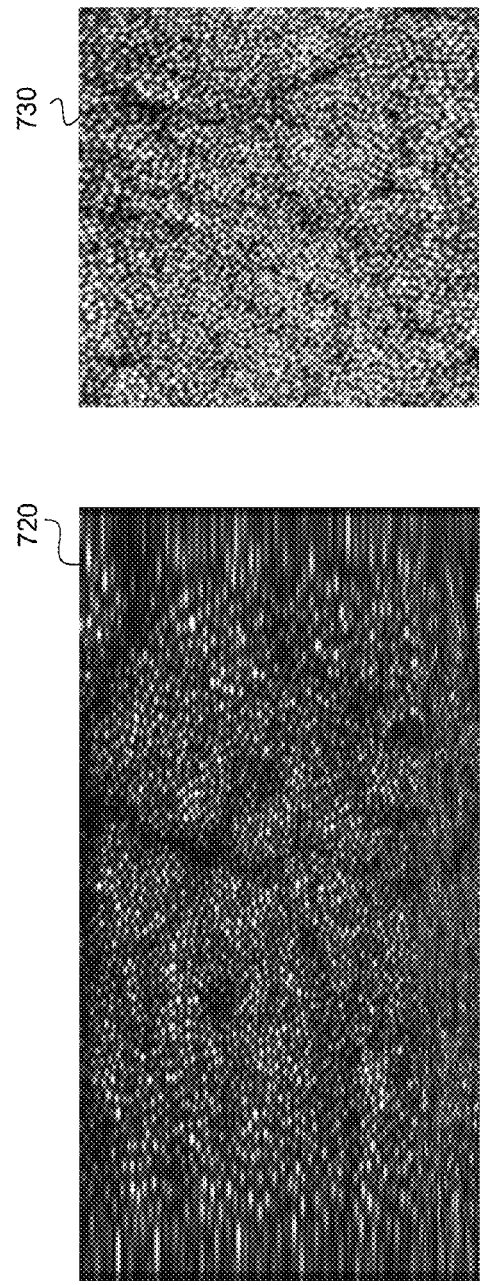
FIG. 7C
FIG. 7B

IMAGE BASED CORRECTION OF DISTORTION FROM A SCANNER

BACKGROUND

1. Field

The present disclosure relates to a scanning imaging system and systems, methods, and non-transitory computer readable medium with instructions for correcting distortions associated with a scanning imaging system.

2. Description of the Related Art

Modern Imaging systems and methods may be divided into two broad groups. In a first method, direct imaging, an object is illuminated and then light is collected from the object and detected using an array of detectors. In the second method, image scanning, an object is illuminated by a small spot that is scanned across the object, and light is then collected using one or more detectors.

Direct imaging transforms spatial variations of the object into spatial variations on an imaging array. Image scanning transforms spatial variations of the object into temporal variations as measured by a detector.

The accuracy of the image scanning is highly dependent upon repeatability, reliability, and accuracy of the spatial to temporal transformation. The spatial to temporal transformation is typically performed by a moving mirror. The mirror may be driven using electrostatic or electromotive forces. One example of a moving mirror is a galvano scanner. The galvano scanner may be driven in stepwise, and/or linear manner which can produce accurate but slow results. By operating the galvano scanner in a stepwise and/or linear manner, there is a direct linear transformation between spatial locations on the object and points in time.

A second method of moving a mirror is to use a resonant scanner. The resonant scanner may be a galvano scanner which is driven in a resonant mode or may be a specifically designed mechanical scanner designed to be driven in a resonant mode at a specific frequency. One advantage of a resonant scanner over a linear scanner or a stepping scanner is that resonant scanners can be driven at a higher speed. A disadvantage of a resonant scanner is that the scanner motion is approximately sinusoidal. In addition, the relative position of the scanner can drift with time and temperature.

In a scanning system such as a confocal microscopes or a scanning laser ophthalmoscope, the resonant scanner, which can be driven run at kHz frequencies, is employed to scan the object. Resonate scanners are often driven by a sinusoidal signal, so that the physical motion of the scanner is also sinusoidal or very close to sinusoidal. As a consequence, specimen images from the scanning systems are distorted. There are several existing technologies to correct the sinusoidal distortion caused by the scanner.

One method of solving this problem is to use a non-linear variable pixel clock as described in Daniel X. HAMMER, et al., Adaptive Optics Scanning Laser Ophthalmoscope for Stabilized Retinal Imaging, 2006 (hereinafter Hammer). Hammer describes using a custom timing board to provide sync signals and a non-linear pixel clock to a Frame Grabber to linearize the sinusoidal scan produced by the resonant scanner. As noted by Hammer small phase errors in the generated non-linear pixel dock and the actual scanner output can cause distortions where the sinusoidal scan is flat and the pixel dock sampling is sparse.

One method which is an Optical-Electrical Variable Pixel Clock system (OEVPC) may be used to generate the variable pixel clock which is sent to an Analog-to-Digital Converter (ADC), so that the ADC samples the specimen data non-uniformly in the temporal domain, but uniformly in the spatial domain. As a consequence, specimen images from the ADC are linear without sinusoidal distortion. The advantages of the variable pixel clock approach includes: correction of sinusoidal distortion in real time; and high accuracy. The downside of the OEVPC is an increase in costs on the hardware side. For example, the optical system is larger and more complex. The frame grabber also needs to be able to handle a variable pixel dock. In addition, if the users want's to have multiple options for the scanning field of view (FOV) and/or number of pixels along the FOV, then the OEVPC needs to be designed to handle these variations.

A second method which is an Electrical Variable Pixel Clock system (EVPC) uses an electronic system to generate the variable pixel dock. This approach may involve: getting an analog motion signal generated by resonant scanner; building a lookup table based on a calibration of the motion signal; building a phase lock loop (PLL) circuit and a frequency divider to generate a variable pixel dock from a high-frequency uniform reference clock (e.g., 1 GHz). The EVPC can be less expensive than the OEVPC. The EVPC has relatively high accuracy but has some of the same problems associated with the OEVPC. The EVPC is also dependent upon the stability of the resonate scanner. The resonate scanner may drift over time and variations in temperature. The flexibility of EVPC is also dependent upon the reference clock and the look up table.

A third method of solving this problem is a calibration method. The calibration method uses a calibration grid placed at the location of the specimen to calibrate the sinusoidal distortion. The calibration grid is then measured using the same method that is used to measure the specimen. A lookup table or a conversion matrix is then used to correct the sinusoidal distortion. Some disadvantages of the calibration method are: it doesn't optimize sampling window so the distortion along sampling FOV of raw images is not symmetric; and users have to re-calibrate the sinusoidal distortion regularly, when parameters such as scanning FOV and number of pixels are changed. U.S. Pat. No. 5,296,703 describes a calibration method which uses a calibration grid such as a Ronchi Ruling.

One problem with the EVPC method and the calibration method is that they are not able to resolve the problem of a drifting synchronization signal from the resonant scanner. The ADC receives a synchronization signal usually referred to as the horizontal synchronization signal (H-sync) which is a square wave from the motion signal of the resonant scanner. Due to mechanical and/or electronic failures, the rising/falling edges of the square wave are not always locked to the physical motion of the resonant scanner. This failure causes a slow drifting of the H-sync, and as a result, the image sampled by the ADC also drifts. This may show up in the image as a random skew distortion. The EVPC method and the calibration method are blind to the drifting, so the variable pixel dock or the lookup table are not updated dynamically and are applied to different data sampling windows. As a consequence, the correcting sinusoidal distortion introduces new distortions due on top of the H-sync drifting.

What is needed is a more flexible method of correcting the sinusoidal distortion associated with the resonant scanner.

SUMMARY

An exemplary embodiment is directed towards systems, method, and non-transitory computer readable medium for imaging an object. The system includes a scanner. The scanner positions a spot on the object along a scanning path. The scanning path includes a plurality of scan lines. The system includes a detector arranged to output raw data associated with positions along the scanning path. The system includes one or more processors that perform calculations. The calculations include dividing the raw data into forward scan data and backward scan data. The calculations include reversing the order of the backward scan data to produce inverted backward scan data. The calculations include determining an offset value that is associated with a maximum value of a first function based on the forward scan data and the inverted backward scan data. The forward scan data is shifted by the offset value relative to the inverted backward scan data. The calculations include producing a first image of the object that comprises the forward scan data interlaced with the inverted backward scan data. The forward scan data is shifted by the offset value relative to the inverted backward scan data.

An exemplary embodiment comprises producing a first series of images. Each image in the first series of images comprises a portion of the forward scan data interlaced with a portion of the inverted backward scan data. Each image in the first series of images is associated with a shift value. The forward scan data of each image in the first series of images is shifted by the shift value relative to the inverted backward scan data. It further comprises transforming each image in the first series of images from a spatial dimension to frequency dimension to produce a second dataset associated with each image in the first series of images. A second series of datasets comprising the second dataset associated with each image in the first series of images is produced. A frequency peak is identified in each second dataset. The second dataset in the second series of datasets with the frequency peak that has the maximum intensity as the third dataset is identified. The shift value of the third dataset as the offset value is identified.

In an exemplary embodiment the first function is a cross-correlation function of a portion of the forward scanning data and a portion of the inverted backward scanning data. The cross-correlation function is calculated relative to shift values between the forward scan data and the inverted backward scan data. The offset value is the shift value associated with the maximum value of the first function.

In an exemplary embodiment the spot is a spot of light. An exemplary embodiment may include a light source for producing the spot of light. The light source maybe: a laser; a broadband light source; or multiple lights sources.

In an exemplary embodiment the detector detects the spot of light reflected from the object and the raw data is a time series of data points associated with physical positions along the scanning path.

In an exemplary embodiment the forward scan data is associated with forward portions of the scanning path. The backward scan data is associated with backward portions of the scanning path. The forward portions of the scanning path are not parallel to the backward portions of the scanning path.

In an exemplary embodiment the forward portions of the scanning path include a plurality of forward scanning lines that are parallel to each other, and the backward portions of the scanning path include a plurality of backward scanning lines that are parallel to each other.

In an exemplary embodiment a second image of the object is produced by transforming the first image to compensate for the relative variations in the motion of the scanner.

In an exemplary embodiment the scanner includes a resonant scanner, and the relative variations in the motion of the scanner refers to the substantially sinusoidal motion of the resonant scanner.

In an exemplary embodiment a third image of the object is produced by cropping the second image to a limited portion of the second image. The limited portion of the second image is associated with portions of the scanning path in which motion of the scanner substantially linear.

In an exemplary embodiment the plurality of scan lines consists of one forward scan line and one backward scan line. The first image consists of two lines. Multiple first images of the object are obtained. The multiple first images are combined into a fourth image.

An exemplary embodiment the scanner comprises a second scanner moving in a direction substantially perpendicular to a resonate scanner.

An exemplary embodiment further comprises forming a horizontal synchronization signal based on the offset value.

Further features and aspects will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments.

FIGS. 7A-C are illustrations of data produced at various steps in an exemplary embodiment.

DESCRIPTION OF THE EMBODIMENTS

Figure 1:
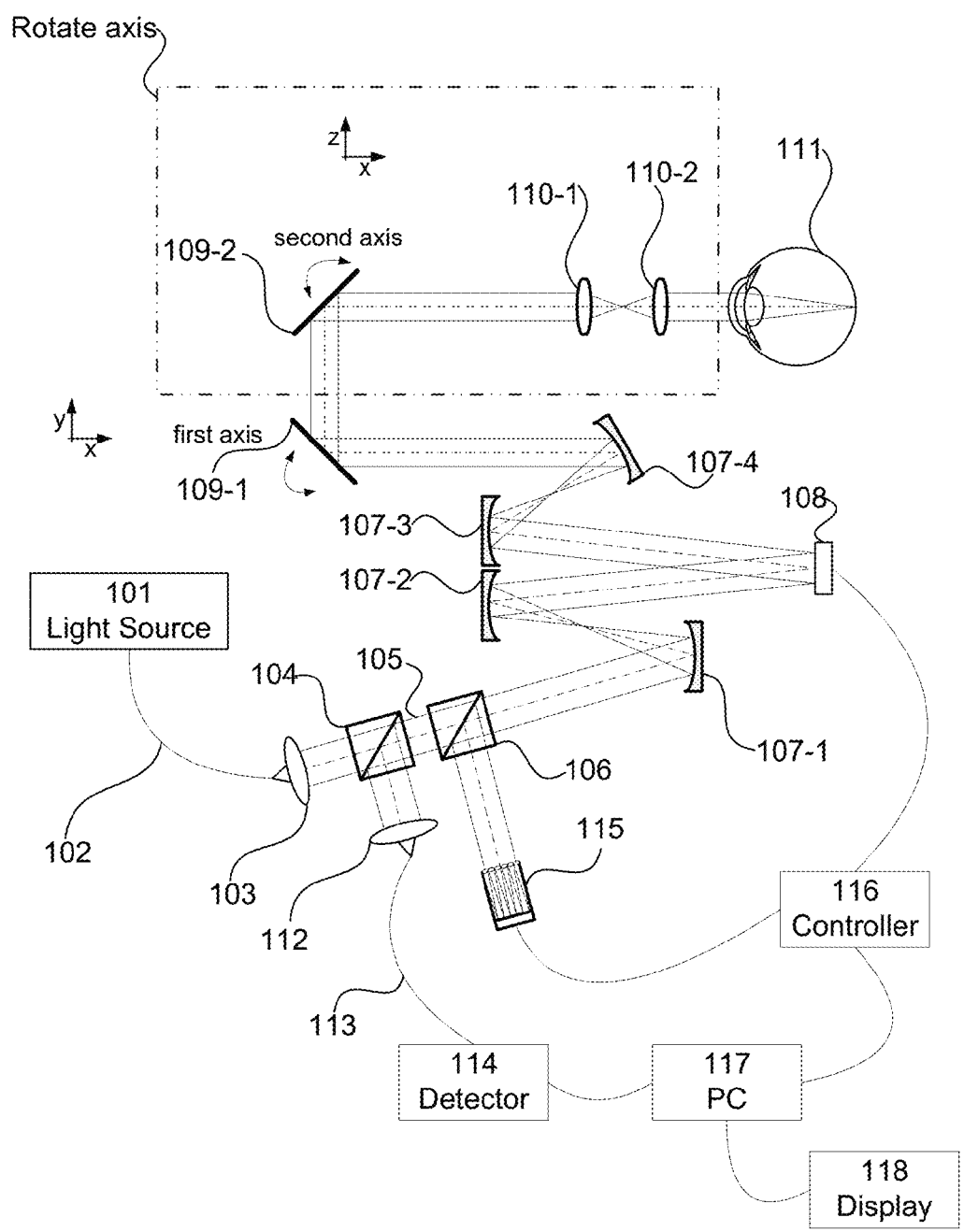
FIG. 1 is an illustration of an ophthalmoscope.

Embodiments will be described below with reference to the attached drawings. Further, an image photographing apparatus as disclosed in the following can be applied to an object to be inspected such as an eye to be inspected, skin, and internal organs.

Ophthalmoscope

A first embodiment is described with reference to of a fundus image photographing apparatus such as the photographing apparatus illustrated in FIG. 1.

Embodiments are directed towards systems, methods, and software which are used in connection with an imaging system such as an Ophthalmoscope. FIG. 1 is an illustration of an exemplary ophthalmoscope. An ophthalmoscope is a system or apparatus for obtaining information about an interior portion of the eye 111 (e.g., the fundus).

An exemplary embodiment may be a scanning ophthalmoscope. A scanning ophthalmoscope scans a spot across the eye. The spot may be a spot of light from a light source that is scanned across the eye.

In an exemplary embodiment, the spot of light is produced by a light source 101. The light source 101 may be incorporated into the ophthalmoscope; alternatively, the ophthalmoscope may include an input for receiving a light source 101. The input for the light source 101 may be a fiber optic input or a free space input. The light source 101 may be a laser, a broadband light source, or multiple light sources. In an exemplary embodiment, the light source 101 is a super luminescent diode (SLD) light source having a wavelength of 840 nm. The wavelength of the light source 101 is not particularly limited, but the wavelength of the light source 101 for fundus image photographing is suitably set in a range of approximately 800 nm to 1,500 nm in order to reduce glare for a person to be inspected and maintain imaging resolution.

In an exemplary embodiment, light emitted from the light source 101 passes through a single-mode optical fiber 102, and is radiated as collimated light (measuring light 105) by a collimator 103.

In exemplary an embodiment, the polarization of the irradiated light may be adjusted by a polarization adjusting member 119 (not shown) provided in a path of the single-mode optical fiber 102. In an alternative configuration, the light source 102 is polarized and single-mode optical fiber 102 is polarization maintain fiber. In another configuration, the polarization adjusting member may be placed after the collimator 103. Alternatively, the polarization adjusting member may be replaced with a polarizer.

The measuring light 105 radiated from the collimator 103 passes through a light division portion 104 including a beam splitter. An exemplary embodiment may include an adaptive optical system. Exemplary embodiments include both systems that do and do not include the adaptive optical system.

The adaptive optical system includes a light division portion 106, a wave front sensor 115, wave front correction device 108, and reflective mirrors 107-1 to 107-4 for guiding the measuring light 105 to those components. The reflective mirrors 107-1 to 107-4 are provided to guide the measuring light 105 to and from the pupil of an eye 111, the wave front sensor 115, and the wave front correction device 108. The wave front sensor 115 and the wave front correction device 108 may be in an optically conjugate relationship. A beam splitter may be used as the light division portion 106. The wave front sensor 115 may be a Shack-Hartmann sensor.

The measuring light 105 passing through the light division portion 106 is reflected on the reflective mirrors 107-1 and 107-2 to enter the wave front correction device 108. The measuring light 105 reflected on the wave front correction device 108 and is further reflected on the reflective mirrors 107-3 and 107-4.

In an exemplary embodiment, one or two spatial phase modulators including a liquid crystal element is used as the wave front correction device 108. The liquid crystal element may modulate a phase of only a specific polarized component. In which case, two liquid crystal elements may be employed to modulate substantially orthogonal polarized components of the measuring light 105. In an alternative embodiment, the wave front correction device 108 is a deformable mirror.

The measuring light 105 reflected off mirror 107-4 is two-dimensionally scanned by a scanning optical system 109. In an exemplary embodiment, the scanning optical system 109 includes a first scanner 109-1 and a second scanner 109-2. The first scanner 109-1 rotates around the first axis, while the second scanner 109-2 rotates around a second axis. The first axis is substantially orthogonal to the second axis.

FIG. 1 illustrates the first scanner 109-1 rotating in the x-y plane, while the second scanner 109-2 is rotating in the z-x plane. In the context of the present application, rotating the measuring light 105 in a first plane around the first axis is equivalent to rotating the measuring light 105 in the first plane and is equivalent to scanning the spot of light in the main scanning direction or the lateral direction of the object being imaged. In the context of the present application, rotating the measuring light 105 in a second plane around the second axis is equivalent to rotating the measuring light 105 in the second plane and is equivalent to scanning the spot of light in the sub-scanning direction or the longitudinal direction of the object being imaged. The sub-scanning direction is substantially orthogonal to the main scanning direction.

A scanning period of the first scanner 109-1 is less than the scanning period of the second scanner 109-2. The order of the first scanner 109-1 and the second scanner 109-2 may be exchanged without impacting the operation of an exemplary embodiment. The first scanner 109-1 may operate in a resonant scanning mode.

In an exemplary embodiment, the scanning optical system 109 may be a single scanning mirror that is rotated around the first axis by the first scanner 109-1 and around the second axis by the second scanner 109-2 that is substantially orthogonal to the first axis. An exemplary embodiment may also use non-mechanical beam steering techniques may also be used.

In an exemplary embodiment, the first scanner 109-1 and the second scanner 109-2 are galvano-scanners. In another exemplary embodiment, one of the first scanner 109-1 and the second scanner 109-2 is a resonant scanner. The resonant scanner may be used for the main scanning direction. The resonant scanner may be tuned to oscillate at a specific frequency.

The measuring light 105 scanned by the scanning optical system 109 is radiated to the eye 111 through eyepieces 110-1 and 110-2. The measuring light radiated to the eye 111 is reflected, scattered, or absorbed on the fundus. When the eyepieces 110-1 and 110-2 are adjusted in position, suitable irradiation may be performed in accordance with the diopter of the eye 111. Lenses may be used for the eyepiece portion in this embodiment, but other optical components such as spherical mirrors may also be used.

Reflected light which is produced by reflection or scattering on a retina of the eye 111 then travels in the reverse direction along the same path as in the case of incident light. A part of the reflected light is reflected by the light division portion 106 to the wave front sensor 115 to be used for measuring a light beam wave front.

In an exemplary embodiment, a Shack-Hartmann sensor is used as the wave front sensor 115. However, an exemplary embodiment is not limited to a Shack-Hartmann sensor. Another wave front measurement unit, for example, a curvature sensor may be employed or a method of obtaining the wave front by reverse calculation from the formed spot images may also be employed.

In FIG. 1, when the reflected light passes through the light division portion 106, a part thereof is reflected on the light division portion 104 and is guided to a light intensity sensor 114 through a collimator 112 and an optical fiber 113. The light intensity sensor 114 converts the light into an electrical signal. The electrical signal is processed by a control unit 117 into an image of the object, and the image is displayed on a display 118.

The wave front sensor 115 is connected to an adaptive optics control unit 116. The received wave front is transferred to the adaptive optics control unit 116. The wave front correction device 108 is also connected to the adaptive optics control unit 116 and perform modulation as instructed by the adaptive optics control unit 116. The adaptive optics control unit 116 calculates a modulation amount (correction amount) for correction to obtain wave front having no aberration based on the wave front obtained by a measuring result of the wave front sensor 115, and instructs the wave front correction device 108 to perform the modulation according to the modulation amount. The wave front measurement and the instruction to the wave front correction device are repeated and feedback control is performed so as to obtain a suitable wave front.

In an exemplary embodiment the light division portions 104 and 106 are fused fiber couplers. In an alternative exemplary embodiment, the light division portions include partially reflective mirrors.

The detector 114 may detect reflections or fluorescence associated with the scanning spot. The detection system may make use confocal microscopy techniques in which an aperture associated with the scanning spot is used to increase the resolution and/or contrast of the detection system.

Images

Figure 2:
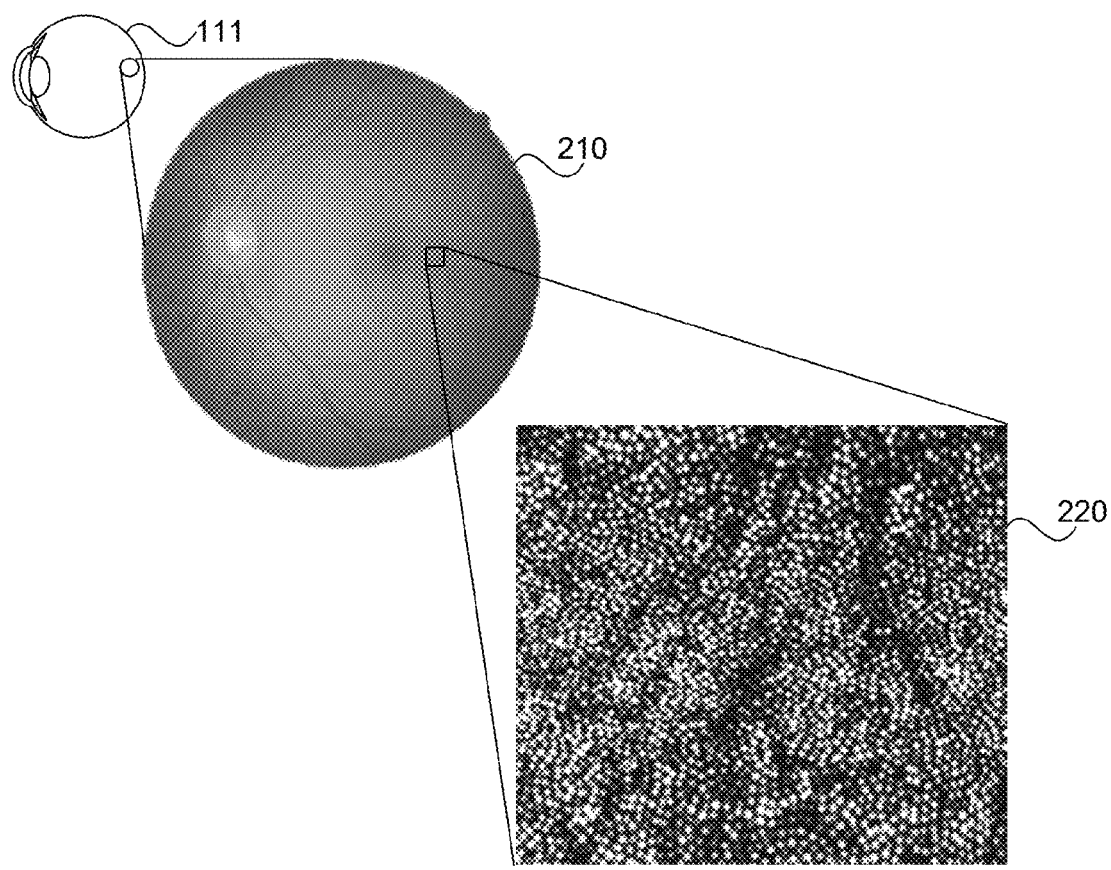
FIG. 2 is an illustration of an image that may be obtained with an exemplary embodiment.

FIG. 2 is an illustration of the images that may be obtained with the detector 114. Image 210 is an example of an interior portion of the eye 111. Image 220 is an example of a magnified portion of image 210. Current high resolution imaging techniques enable the imaging of individual photoreceptors cells as illustrated by image 210 of FIG. 2.

Figure 3:
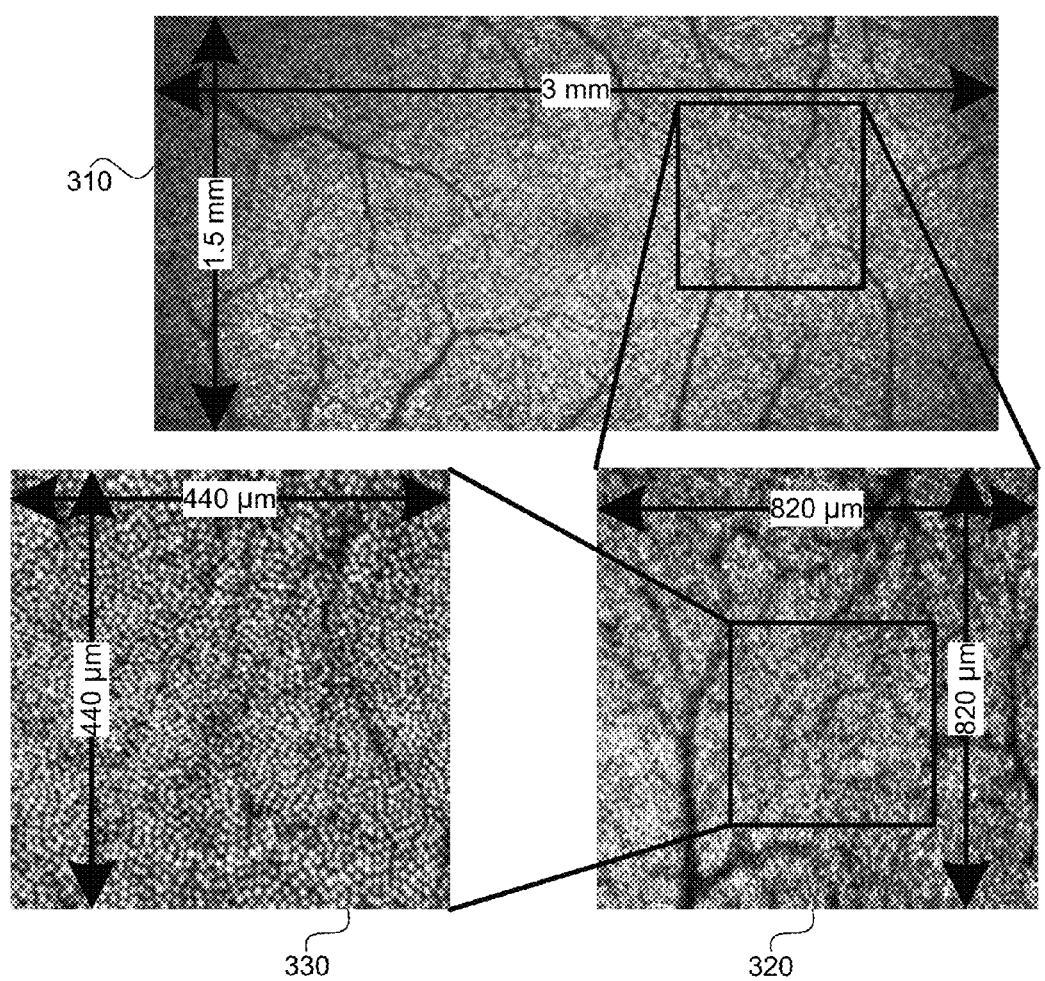
FIG. 3 is an illustration of images produced with an exemplary embodiment.

FIG. 3 is an illustration of images produced with an exemplary embodiment in which the range and resolution are varied. Image 310 is an illustration 3 mm×1.55 mm portion of the 111. Image 320 is an illustration 820 µm×820 µm portion of the 111. Image 330 is an illustration 440 µm×440 µm portion of the 111.

Scanner

The scanning optical system 109 may employ a resonant scanner. The resonant scanner, which usually runs at kHz rates and is employed to scan the object e.g. a specimen. The resonant scanner's physical motion is sinusoidal or very close to sinusoidal. As a consequence, specimen images obtained from resonant scanning systems are distorted. An exemplary embodiment is directed at systems which correct these distortions. Although especially applicable to systems that include resonate scanners, this method can also be adapted to other scanning systems.

Figure 4:
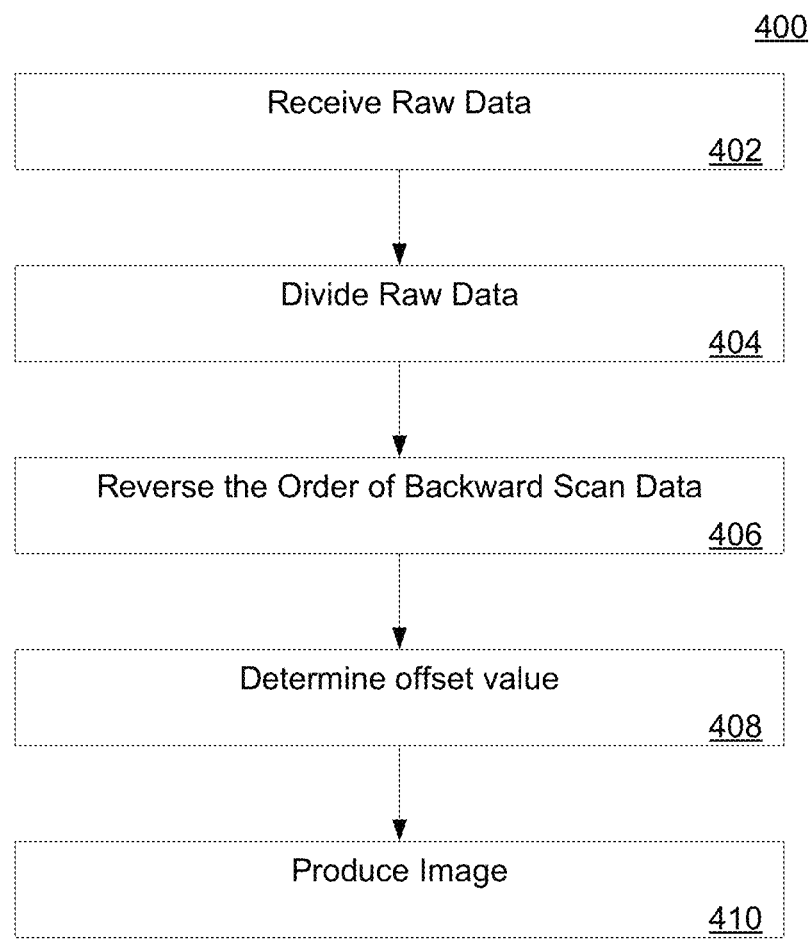
FIG. 4 is an illustration of a method 400.

FIG. 4 is an illustration of a method 400 of implementing an exemplary embodiment. A step 402 of the method 400 includes receiving raw data associated with positions along a scanning path. A step 404 of method 400 includes dividing the raw data into forward scan data and backward scan data. A step 406 of method 400 includes reversing the order of the backward scan data to produce inverted backward scan data. A step 408 of method 400 includes determining an offset value that is associated with a maximum value of a first function based on the forward scan data and the inverted backward scan data, wherein the forward scan data is shifted by the offset value relative to the inverted backward scan data. A step 404 of method 400 includes producing a first image of the object that comprises the forward scan data interlaced with the inverted backward scan data, wherein the forward scan data is shifted by the offset value relative to the inverted backward scan data.

Scanning Paths

Figure 5A:
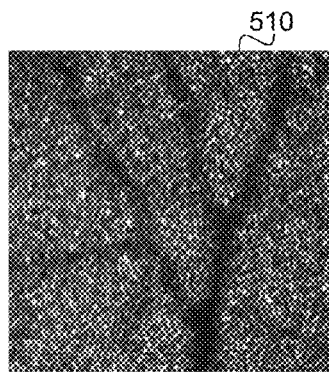
FIGS. 5A-F are illustrations of scanning paths and the scanning path relative to a portion of the object being scanned.
Figure 5B:
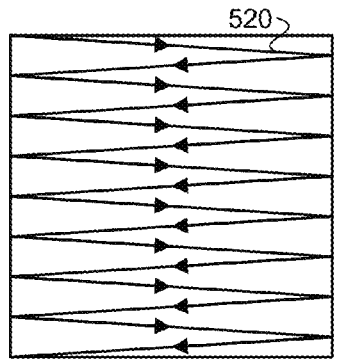
Figure 5C:
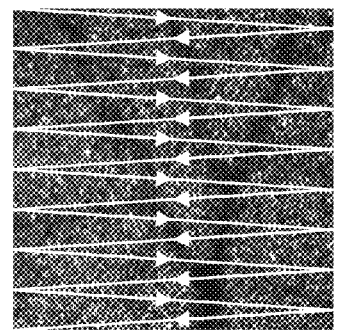

FIG. 5A is an illustration of a portion 510 of an object that would be scanned using an exemplary embodiment. FIG. 5B is an illustration of a scanning path 520, wherein a spot travels when the first scanner 109-1 is scanned back and forth along the first axis, while the second scanner 109-2 is scanned at the same time along the second axis. FIG. 5C is an illustration of the scanning path 520 superimposed over the portion 510 of the object being scanned.

Figure 5D:
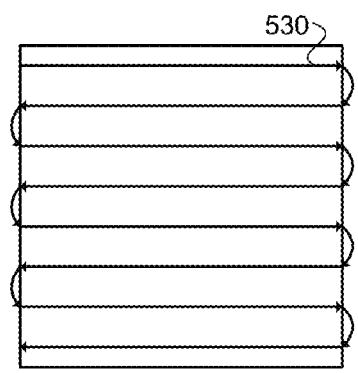

FIG. 5D is an illustration of a first alternative scanning path 530, wherein the spot travels when the first scanner 109-1 is scanned back and forth along the first axis, while the second scanner 109-2 is held in a fixed position during the main portion of the scan and takes a step along the second axis towards the end of the first scanner 109-1 moving in the first direction and the beginning of the first scanner moving in the opposite direction.

Figure 5E:
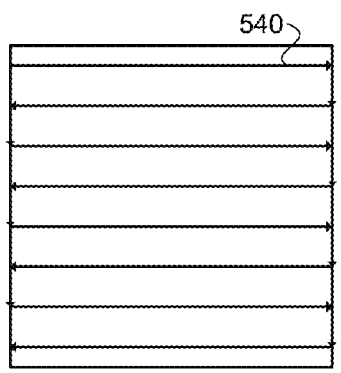

FIG. 5E is an illustration of a second alternative scanning path 540, wherein the spot travels when the first scanner 109-1 is scanned back and forth along the first axis. The second scanner 109-2 is held in a fixed position while the first scanner 109-1 is scanning. In the second alternative scanning path 540 the first scanner 109-1 is held in a fixed position while the second scanner 109-2 is in motion along the second axis.

Figure 5F:
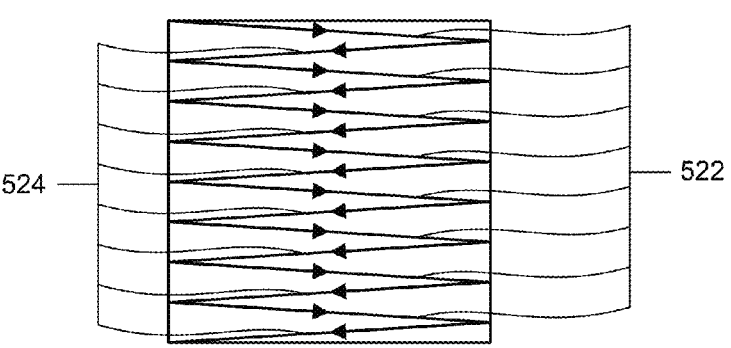

FIG. 5F is an illustration of the scanning path 520, in which the scanning path is divided into two sets of scanning lines: forward scanning lines 522 and backward scanning lines 524.

Synchronization Signals

Figure 6A:
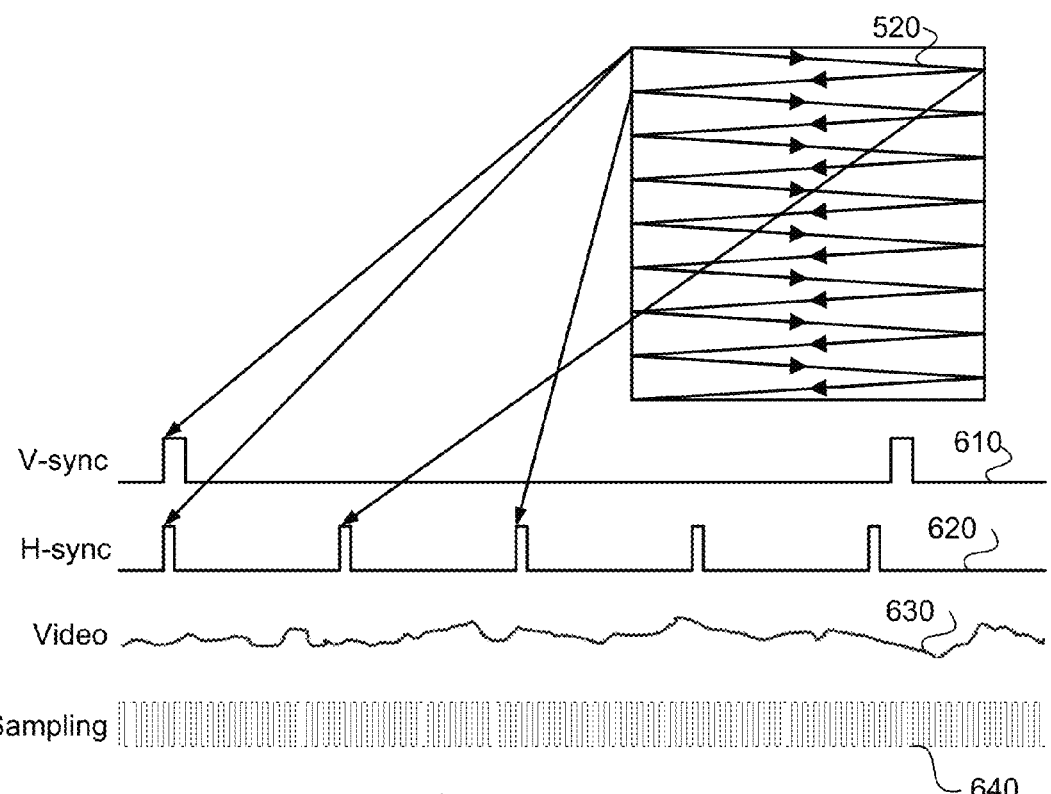
FIGS. 6A-B are illustrations of synchronization signals and their correlation with the scanning paths as implemented in one exemplary embodiment.

FIG. 6A is an illustration of the synchronization signals and their correlation with the scanning path 520 as implemented in one exemplary embodiment. The V-sync signal 610 is coordinated with the start of a frame. The H-sync signal 620 is coordinated with the start of each scan line. Video signal 630 represents an analog signal associated with the measured intensity. A pixel clock 640 is coordinated with a time at which to measure the video signal.

Figure 6B:
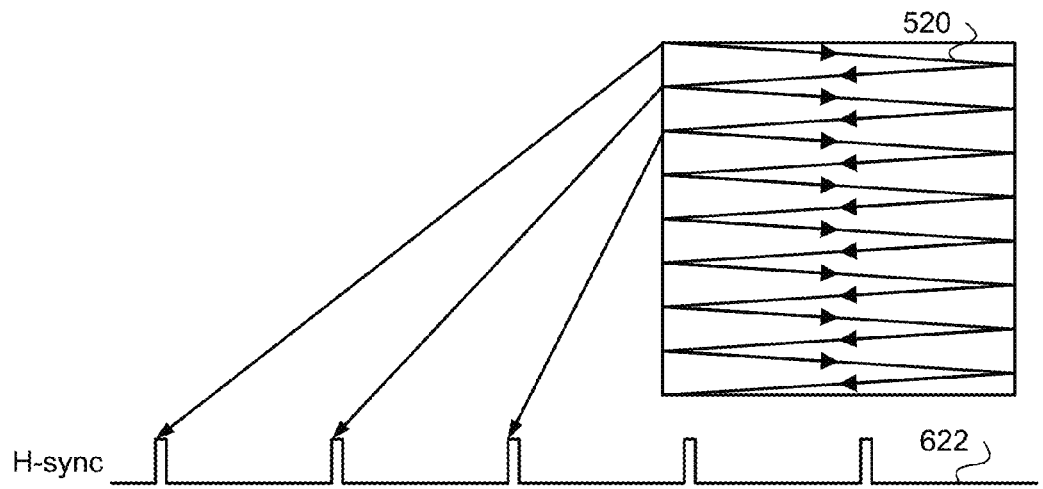

FIG. 6B is an illustration of the synchronization signals and their correlation with the scanning path 520 as implemented in a second exemplary embodiment. In the second embodiment, the H-sync signal 622 is coordinated with the start of each forward scan.

The synchronization signals illustrated in FIGS. 6A-B are leading edge synchronization signals. An exemplary embodiment may be implemented using falling edge synchronization signals.

FIG. 7A is an illustration of raw data 710 which is produced by an exemplary embodiment. The raw data includes multiple scan lines. The raw data 710 can be divided into two sets of data: forward scan data 712 and backward scan data 714. The forward scan data 712 and the backward scan data 714 are interlaced to produce an interlaced image.

In one exemplary embodiment, the H-sync signal 620 is used to divide the raw data 710 into the forward scan data 712 and the backward scan data 714.

In another exemplary embodiment, the H-sync signal 622 is used to divide the raw data 710 into scan lines. Each scan line is divided into one forward scan line 522 and one backward scan line 524. The forward scan data 712 is made up of a set of forward scan lines 522. The backward scan data 714 is made up of a set of backward scan lines 524.

The order of the backward scan data 714 is reversed relative to the forward scan data 712 to create inverted backward scan data 716 (not shown). The forward scan data 712 and the inverted backward scan data 716 are interlaced together to produce an Interlaced image. If the H-sync signal drifts relative to the actual motion of the scanning system this results in distortions in the image. In an exemplary embodiment, this problem is addressed by offsetting the forward scan data 712 relative to the backward scan data by a fixed amount which is determined in a manner discussed below.

FIG. 7B is an illustration of image data 720 is produced from the interlacing of the forward scan data 712 and the inverted scan data 714, in which the forward scan data 712 and the inverted backward scan data 716 have been offset relative to each other. Distortion due to the sinusoidal motion of the resonate scanner is present in image data 720. The distortion is easily corrected using a de-sinusoidal transformation in order produce image data 730 illustrated in FIG. 7C. The image data 730 is also a truncated portion of the image data 720. The image data 730 may be limited to only the linear portion of the sinusoidal motion.

An exemplary embodiment locates a sampling window. This sampling window can be optimized in order to improve the speed acquiring the data and/or the accuracy of the data produced. An exemplary embodiment may dynamically adjust the location of the sampling window to compensate for a drift in the H-sync signal 620. The sinusoidal distortion correction (de-sinusoidal transformation) may be based on interpolation or integration.

The motion of the resonant scanner can be assumed to be sinusoidal without affecting the accuracy of the data collected. The peaks and valleys of the motion of the resonant scanner may not be strictly sinusoidal. This will not degrade the accuracy of an exemplary embodiment, because data collected during the peaks and valleys of the scanner are not typically used. An exemplary embodiment may use a different transformation that more accurately reflects the motion of the scanner in the peaks and valleys.

Timing

Figure 8:
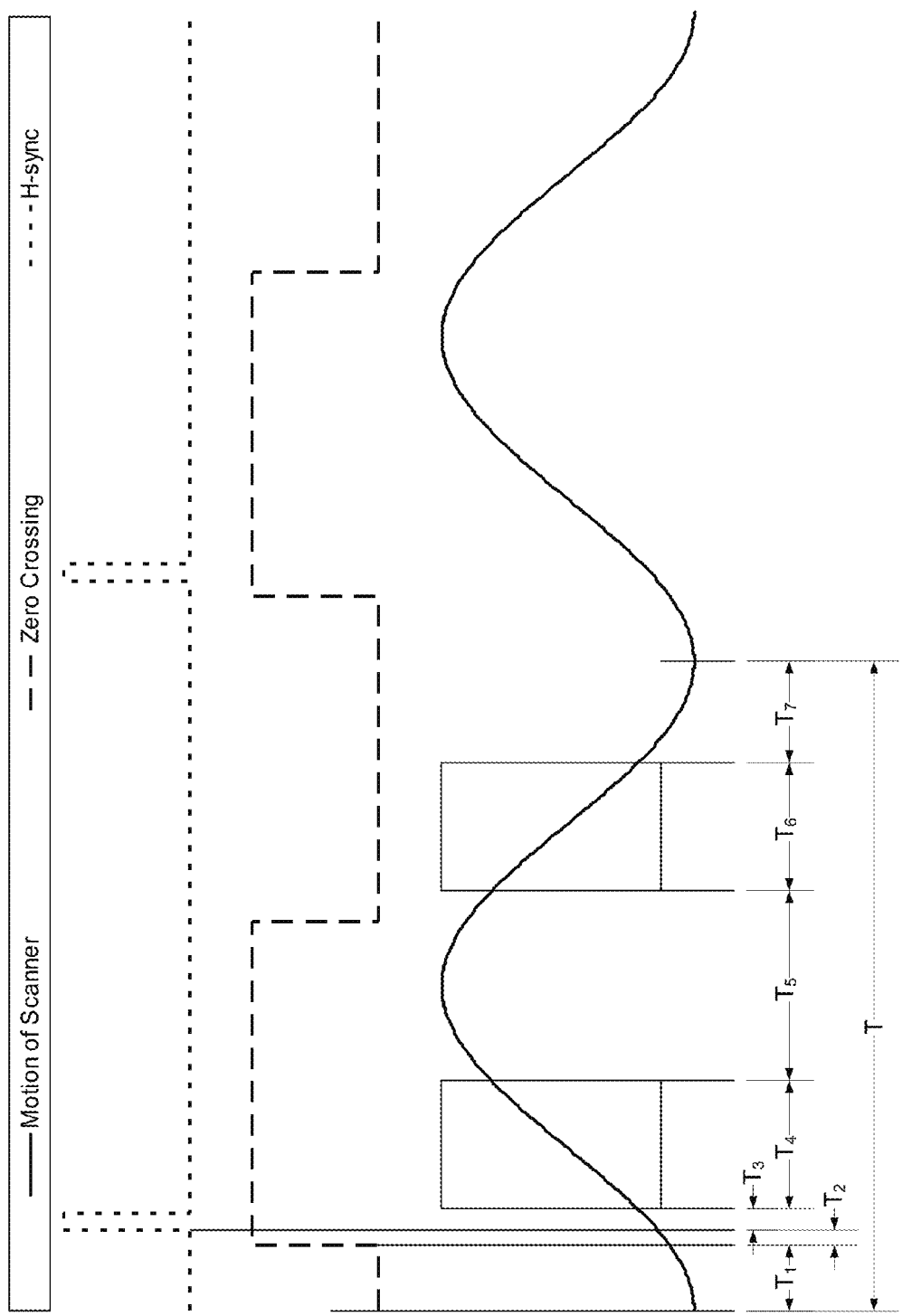
FIG. 8 is an illustration of the timing of the data collection relative to the motion of the resonant scanner.

FIG. 8 is an illustration of the timing of the data collection relative to the motion of the resonant scanner. T1 is the timing latency from scanner motion to rising edge of the zero-crossing signal, and T2 is the ADC conversion latency. T1+T2 is the hardware latency which is not detectable by the ADC. Due to mechanical and/or electronic drifting, T1 drifts with time on some scanning systems, although T2 is quite stable. T3 is typically referred to as the "front porch", T4+T5+T6 is the data sampling window, and is T7 is typically referred to as the "back porch". T is the total timing associated with one period of the motion of the scanner if drifting of the H-sync is not taken into account. Data from T4 and T6 is usable, but data from T5 area is not usable because the scanner moves slowly with significant image distortion. All the parameters above are typically adjustable except for T1 and T2.

In an exemplary embodiment, an optimal sampling window is identified. "Optimal" refers to a sampling window in which: T4 and T6 have the same value; and the distortion associated with the time window T4 is substantially equivalent the distortion associated with the time window T6. In an exemplary embodiment, the distortion associated with the time windows T4 and T6 is sinusoidal. In an exemplary embodiment, the distortion associated with both ends of the windows T4 and T6 is symmetric.

In an exemplary embodiment the relationships below are substantially satisfied:

$$T4=T6 \quad (1)$$

$$T1+T2+T3=T5/2 \quad (2)$$

$$T7=T5/2 \quad (3)$$

$$T=T1+T2+T3+T4+T5+T6+T7 \quad (4)$$

The total timing T as defined in equation 4 may be setup via the ADC. The total timing T maybe defined in terms of the number of pixels per synchronization cycle on the ADC. The total timing T may be stable and/or accurate and phase locked. Define data windows T4 and T6 in a frame grabber such that equation 1 is satisfied. Equations (1)-(3) are substituted into equation (4), so that T5 is defined in terms of T4 and T to come up with equation (6).

$$T5=T/2-T4 \quad (5)$$

The time window T4 is associated with forward scan lines 522 and forward scan data 712. The forward scan data 712 includes at least one forward scan line 522. The time window T6 is associated backward scan lines 524 and inverted backward scan data 716. The inverted backward scan data 716 includes at least one backward scan line 524 that is inverted.

In one exemplary embodiment, a lag time between the forward scan data 712 and the inverted backward scan data 716 is calculated. The lag time may be calculated by finding the maximum of the cross correlation function between the forward scan data 712 and the inverted backward scan data 716. In one exemplary embodiment, the range along which the cross correlation function is calculated is limited to the windows T4 and T6. Such that in an exemplary embodiment, the windows T4 and T6 are lined up without offset or translation, substantially at the center of each half of the forward scanning portion and the backward scanning portion of the sinusoidal curve.

Once the lag time is calculated the front porch T3 is adjusted to line up the forward scan data and the backward scan data 716.

T1 may be considered to be unstable when it is drifting relative to the sampling rate of the ADC over the field of view of the instrument. Thus, when the resolution or the field of view is increased, the stability of T1 becomes more important. In order for the windows T4 and T6 to be at substantially at the same physical sampling position windows, T3 may need to be dynamically adjusted. For example, when T1 changes to T1+Δt, T3 should be adjusted to be T3−Δt.

In one exemplary embodiment, T3 is adjusted periodically. The period of time between adjustments may be on the order of several seconds, since T1 usually drifts slowly. The rate of change of T1, is larger when the instrument starts up, when the ambient temperature changes, or when the temperature of a component within the instrument changes. The period of time between adjustments may vary based upon the time since startup, an internal temperature change, or an ambient temperature change.

Once the optimal timing for the windows of T4 and T6 are determined sinusoidal distortion may be corrected using equation (6) by interpolation or integration.

$$y=\sin(\omega t), t \in [T1+T2+T3, T1+T2+T3+T4] \quad (6)$$

In another exemplary embodiment, if an image 730 has periodic data such as retinal photoreceptor cells. Another method instead of cross correlation may be used to correct the relative temporal position of the sampling windows. As a general rule, retinal photoreceptors are aligned up with each other over a scale of between 2 mm~10 mm in all directions. A 2-dimensional Fourier Transform is performed on a combination of the forward scan data 712 and the inverted backward scan data 716. Other methods besides Fourier Transform, such as Maximum Entropy, and other transforms may be used to calculate frequencies of the data and identify periodic data and/or perform spatial spectral analysis. The periodic data will show up in the Fourier Transform as a specific frequency peak in 2 dimensional Fourier Transfer of the images. The peak frequency depends on the size of the cells and the size of the field of view. After the forward scan data 712 and the inverted backward scan data 716 have been interlaced into a single merged data set. A Fourier Transform may be performed on the data set. The offset between the forward scan data 712 and the inverted backward scan data 716 may be adjusted so as to maximize the height of the peak frequency. The inventor has determined that an image in which the forward scan data 712 and the inverted backward scan data 716 have the correct offset has the highest peak frequency relative to images in which the forward scan data 712 and the inverted backward scan data 716 that have the incorrect offset. T3 can then be adjusted according to the offset calculated by this maximization step.

Figure 9:
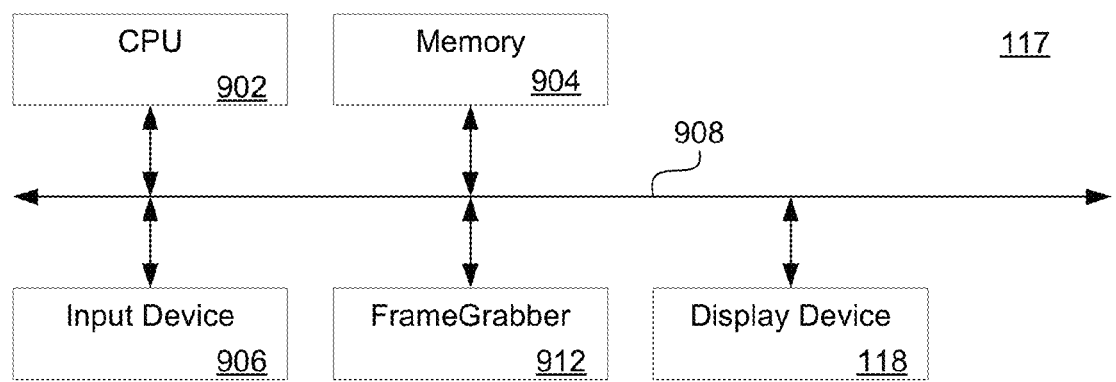
FIG. 9 is an illustration of a device 117 that may be used to implement an exemplary embodiment.

FIG. 9 is an illustration of a device 117 that may be used to implement an exemplary embodiment. The device 117 may be a personal computer or a custom but computing device. The device 117 includes a central processing unit (CPU) 902 for executing instructions. The instructions may be encoded on a non-transitory computer readable medium. The non-transitory computer readable medium may include a recording medium, such as a hard disk, a floppy disk, an optical disk, a magnetic disk, a magneto-optical disk, a magnetic tape, and a non-volatile memory card, and a drive for driving the recording medium and recording information in it. The instructions and the data on which the instructions are performed may be stored in a memory 904. The device may include an input device 906 such as a keyboard, a mouse, touch panel, a stylus, and/or one or more buttons which provides a user with a method for providing information to the device. A bus 908 includes an address bus or a data bus and is connected to each unit in the configuration. The device 117 may include or be connected to a display device 118. The display device 118 can be used to display the state of the device and/or various input operations and processing results. The display device 118 can be formed of an LCD (liquid crystal display), a PDP (plasma display panel), an OLEO (organic light-emitting diode), or the like, and can display images and/or text. The device 117 may include or be connected to a frame grabber 912 that is connected to detector 114.

This exemplary embodiment enables imaging systems to be optimized to accurately correct sinusoidal image distortion from a resonant scanner by combining the advantages of existing hardware and software technologies. An exemplary embodiment enables the accurate identification of the start position of each scan line, so that the interlacing procedure may be done in an accurate manner.

Aspects of an exemplary embodiment can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as an exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An imaging system for imaging an eye, comprising:
a scanner, wherein the scanner positions a spot of light on the eye along a scanning path, the scanning path includes a plurality of scan lines;
a detector arranged to output raw data associated with positions along the scanning path, wherein the detector detects the spot of light reflected from the eye;
one or more processors that perform calculations comprising:
dividing the raw data into forward scan data and backward scan data;
reversing the order of the backward scan data to produce inverted backward scan data;
determining an offset value by calculating cross-correlation between the forward scan data and the inverted backward scan data; and
producing a first image of the eye that comprises the forward scan data and the inverted backward scan data, wherein the forward scan data is shifted by the offset value relative to the inverted backward scan data, and
adjusting a data sampling window based on the offset value.

2. The imaging system of claim 1, wherein the eye is a fundus of the eye.

3. The imaging system of claim 1, wherein the cross-correlation is calculated relative to shift values between the forward scan data and the inverted backward scan data, and the offset value is a shift value associated with a maximum value of the cross-correlation.

4. The imaging system of claim 1, further comprising a light source for producing the spot of light, wherein the light source is a laser, a broadband light source, or multiple lights sources.

5. The imaging system of claim 1, wherein the raw data is a time series of data points associated with physical positions along the scanning path.

6. The imaging system of claim 1, wherein the forward scan data is associated with forward portions of the scanning path, the backward scan data is associated with backward portions of the scanning path, and the forward portions of the scanning path are not parallel to the backward portions of the scanning path.

7. The imaging system of claim 6, wherein the forward portions of the scanning path include a plurality of forward scanning lines that are parallel to each other, and the backward portions of the scanning path include a plurality of backward scanning lines that are parallel to each other.

8. The imaging system of claim 1, further comprising:
producing a second image of the eye by transforming the first image to compensate for the relative variations in the motion of the scanner.

9. The imaging system of claim 8, wherein the scanner includes a resonant scanner, and the relative variations in the motion of the scanner refers to the substantially sinusoidal motion of the resonant scanner.

10. The imaging system of claim 8, further comprising: producing a third image of the eye by cropping the second image to a limited portion of the second image, wherein the limited portion of the second image is associated with portions of the scanning path in which motion of the scanner substantially linear.

11. The imaging system of claim 1, wherein the plurality of scan lines consists of one forward scan line and one backward scan line, the first image consists of two lines, multiple first images of the eye are obtained; the multiple first images are combined into a fourth image.

12. The imaging system of claim 1, wherein the scanner further comprises a second scanner moving in a direction substantially perpendicular to a resonant scanner.

13. The imaging system of claim 1, further comprising forming a horizontal synchronization signal based on the offset value.

14. A method of synchronizing scan lines associated with an image of an eye, comprising:
receiving raw data associated with positions of a spot of light along a scanning path on the eye, wherein the raw data is from a detector that detects the spot of light reflected from the eye;
dividing the raw data into forward scan data and backward scan data;
reversing the order of the backward scan data to produce inverted backward scan data;
determining an offset value by calculating cross-correlation between the forward scan data and the inverted backward scan data; and
producing a first image of the eye that comprises the forward scan data and the inverted backward scan data, wherein the forward scan data is shifted by the offset value relative to the inverted backward scan data, and adjusting a data sampling window based on the offset value.

15. A non-transitory computer readable medium encoded with instructions for:
receiving raw data associated with positions of a spot of light along a scanning path on the eye, wherein the raw data is from a detector that detects the spot of light reflected from the eye;
dividing the raw data into forward scan data and backward scan data;
reversing the order of the backward scan data to produce inverted backward scan data;
determining an offset value by calculating cross-correlation between the forward scan data and the inverted backward scan data; and
producing a first image of the eye that comprises the forward scan data and the inverted backward scan data, wherein the forward scan data is shifted by the offset value relative to the inverted backward scan data, and adjusting a data sampling window based on the offset value.

16. The imaging system of claim 1, wherein the first image of the eye comprises the forward scan data interlaced with the inverted backward scan data.

17. The method of claim 14, wherein the first image of the eye comprises the forward scan data interlaced with the inverted backward scan data.

18. The non-transitory computer readable medium of claim 15, wherein the first image of the eye comprises the forward scan data interlaced with the inverted backward scan data.

* * * * *